US008264371B2

(12) United States Patent
McFarland et al.

(10) Patent No.: US 8,264,371 B2
(45) Date of Patent: Sep. 11, 2012

(54) METHOD AND DEVICE FOR COMMUNICATING CHANGE-OF-VALUE INFORMATION IN A BUILDING AUTOMATION SYSTEM

(75) Inventors: Norman R. McFarland, Palatine, IL (US); Geoffrey D. Nass, Rolling Meadows, IL (US); Pornsak Songkakul, Mequon, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 1255 days.

(21) Appl. No.: 11/969,111

(22) Filed: Jan. 3, 2008

(65) Prior Publication Data

US 2009/0177298 A1    Jul. 9, 2009

(51) Int. Cl.
*G08C 19/16* (2006.01)
(52) U.S. Cl. ......... 340/870.01; 340/870.02; 340/870.03; 340/870.07; 700/90
(58) Field of Classification Search ............. 340/870.01; 370/473; 455/69
See application file for complete search history.

(56) References Cited

U.S. PATENT DOCUMENTS

| | | | | |
|---|---|---|---|---|
| 6,119,125 A * | 9/2000 | Gloudeman et al. | .................. | 1/1 |
| 6,167,316 A * | 12/2000 | Gloudeman et al. | .............. | 700/2 |
| 2002/0019215 A1 * | 2/2002 | Romans | .......................... | 455/69 |
| 2005/0078672 A1 | 4/2005 | Caliskan et al. | | |
| 2005/0094667 A1 * | 5/2005 | Dahlman et al. | .............. | 370/473 |
| 2005/0154494 A1 * | 7/2005 | Ahmed | .......................... | 700/275 |
| 2006/0028997 A1 * | 2/2006 | McFarland | .................... | 370/252 |
| 2007/0195808 A1 * | 8/2007 | Ehrlich et al. | ................ | 370/408 |
| 2007/0242688 A1 | 10/2007 | McFarland | | |

FOREIGN PATENT DOCUMENTS

EP    1545069 A1    6/2005

OTHER PUBLICATIONS

International Search Report including Notification of Transmittal of the International Search Report, International Search Report and Written Opinion of the International Searching Authority (PCT/US2008/013746).

* cited by examiner

*Primary Examiner* — Jared Fureman
*Assistant Examiner* — Alfonso Perez Borroto

(57) ABSTRACT

An automation component configured for wireless communication within a building automation system includes a wireless communications component, a processor in communication with the wireless communications component, and a memory in communication with the processor. The memory configured to store computer readable instructions which are executable by the processor to process a change-of-value message received via the wireless communications component, generate a change-of-value update in response to the change-of-value message, and communicate the change-of-value update via the wireless communication component. This change-of-value can occur in a polled (pull) fashion, or in a pushed (when it occurs) fashions.

21 Claims, 4 Drawing Sheets

METHOD AND DEVICE FOR COMMUNICATING CHANGE-OF-VALUE INFORMATION IN A BUILDING AUTOMATION SYSTEM

BACKGROUND

The present disclosure generally relates to communications within a building automation system. In particular, the present disclosure relates to methods and devices for communicating change-of-value information within a building automation system.

A building automations system (BAS) typically integrates and controls elements and services within a structure such as the heating, ventilation and air conditioning (HVAC) system, security services, fire systems and the like. The integrated and controlled systems are arranged and organized into one or more floor level networks (FLNs) containing application or process specific controllers, sensors, actuators, or other devices distributed or wired to form a network. The floor level networks provide general control for a particular floor or region of the structure. For example, a floor level network may be an RS-485 compatible network that includes one or more controllers or application specific controllers configured to control the elements or services within floor or region. The controllers may, in turn, be configured to receive an input from a sensor or other device such as, for example, a room temperature sensor (RTS) deployed to monitor the floor or region. The input, reading or signal provided to the controller, in this example, may be a temperature indication representative of the physical temperature. The temperature indication can be utilized by a process control routine such as a proportional-integral control routine executed by the controller to drive or adjust a damper, heating element, cooling element or other actuator towards a predefined set-point.

Information such as the temperature indication, sensor readings and/or actuator positions provided to one or more controllers operating within a given floor level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included floor level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590,157, filed on Oct. 31, 2006, and co-pending U.S. patent application Ser. No. 10/915,034, filed on Aug. 8, 2004, the contents of these applications are hereby incorporated by reference for all purposes.

Wireless devices, such as devices that comply with IEEE 802.15.4/ZigBee protocols, may be implemented within the control scheme of a building automation system without incurring additional wiring or installation costs. ZigBee-compliant devices such as full function devices (FFD) and reduced function devices (RFD) may be interconnected to provide a device net or mesh within the building automation system. For example, full function devices are designed with the processing power necessary to establish peer-to-peer connections with other full function devices and/or execute control routines specific to a floor or region of a floor level network. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device.

Wireless devices for use within the building automation system must be configured in order to establish communications with the different elements, components and networks that comprise the building automation system. Systems and method for configuring and establishing communications between the wireless devices and the automation components may be desirable and facilitate the setup, configuration, maintenance and operation of the building automation system.

SUMMARY

The present disclosure generally provides for communicating information between wireless devices and/or automation components operating within a building automation system (BAS). Wireless devices and/or automation components may be configured to automatically provide or otherwise push communications from one device to another upon detection of a change-of-value or change in the state of a sensed or monitored value, component and/or indicator.

In one embodiment, an automation component configured for wireless communication within a building automation system is disclosed. The automation component includes a wireless communications component, a processor in communication with the wireless communications component, a memory in communication with the processor and configured to store computer readable instructions which are executable by the processor. The computer readable instructions are programmed to process a change-of-value message received via the wireless communications component, generate a change-of-value update in response to the change-of-value message, and communicate the change-of-value update via the wireless communication component.

In another embodiment, a method for optimizing communications between automation components operating within a building automation system is further disclosed. The method includes detecting an indication representing a change-of-value, generating a change-of-value message, communicating the change-of-value message in response to the detected indication and receiving an acknowledgment of the communicated change-of-value message.

In another embodiment, an automation component configured for wireless communication within a building automation system is disclosed. The automation component includes a wireless communications component, a processor in communication with the wireless communications component, a memory in communication with the processor and configured to store computer readable instructions which are executable by the processor. The computer readable instructions are programmed to receive at least one change-of-value update via the wireless communications component, storing the at least one change-of-value update corresponding to at least one wireless device, and communicate the at least one change-of-value update in response to a polling request.

In another embodiment, a method of communicating information between automation components operating within a building automation system is disclosed. The method includes receiving a change-of-value message representing a wireless device indication, storing the received change-of-value message according to the corresponding wireless device, and communicating a change of value update that includes the change-of-value message.

Additional features and advantages of the present invention are described in, and will be apparent from, the following Detailed Description and the figures.

BRIEF DESCRIPTION OF THE FIGURES

The method, system and teaching provided relate to binding automation components within a building automation system (BAS).

DETAILED DESCRIPTION

Figure 1:
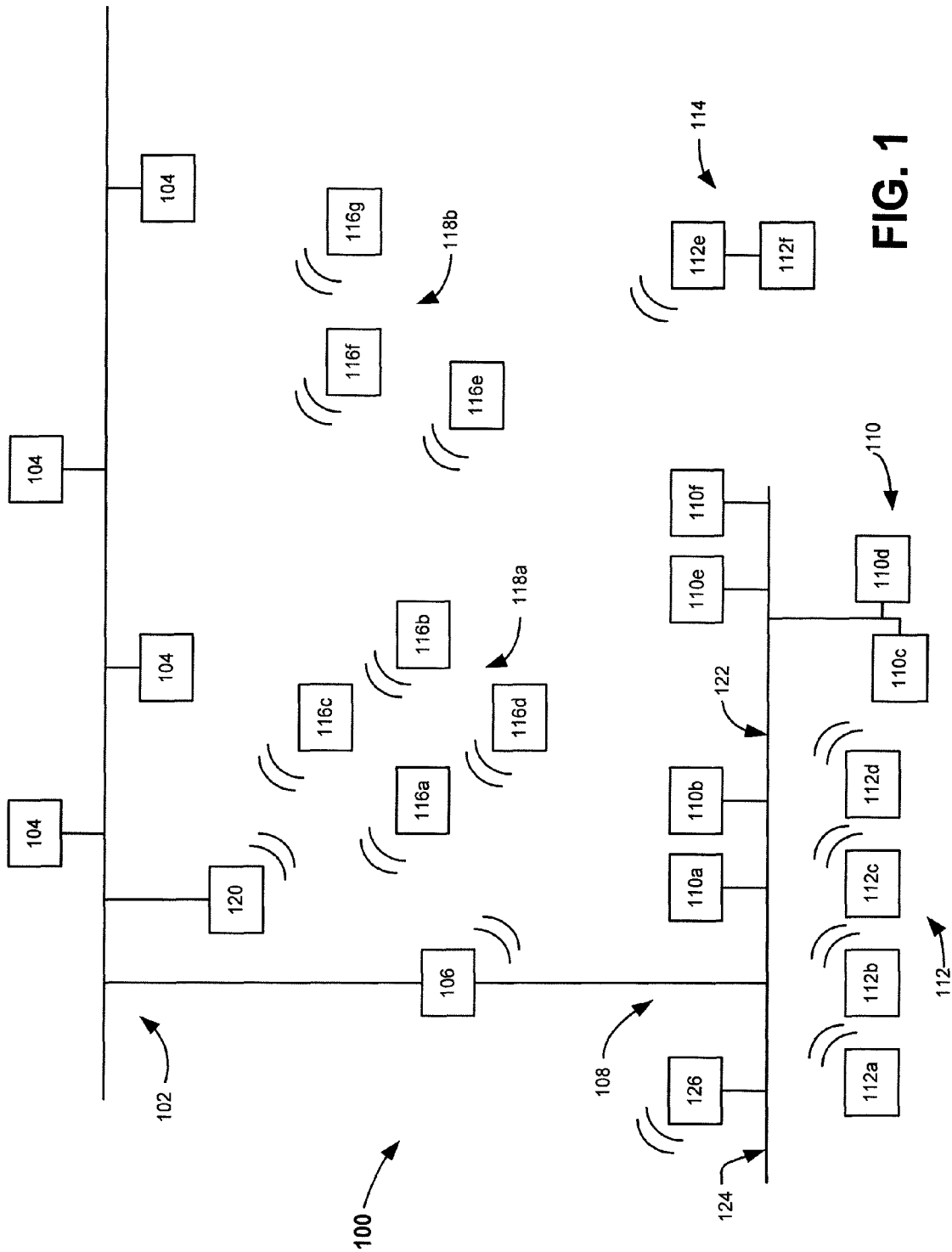
FIG. 1 illustrates an embodiment of a building automation system configured in accordance with the disclosure provided herein.

The embodiments discussed herein include automation components, wireless devices and transceivers. The devices may be IEEE 802.15.4/ZigBee-compliant automation components such as: a personal area network (PAN) coordinator which may be implemented as a field panel transceiver (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as an example of automation components, wireless devices and transceivers that may be integrated and utilized within a building automation system embodying the teachings disclosed herein and are not intended to limit the type, functionality and interoperability of the devices and teaching discussed and claimed herein. Moreover, the disclosed building automation system describes automation components that may include separate wireless devices and transceivers, however it will be understood that that the wireless device and transceiver may be integrated into a single automation component operable within the building automation system.

I. Building Automation System Overview

One exemplary building automation system that may include the devices and be configured as described above is the APOGEE® system provided by Siemens Building Technologies, Inc. The APOGEE® system may implement RS-485 wired communications, Ethernet, proprietary and standard protocols, as well as known wireless communications standards such as, for example, IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be suitable for industrial control and sensing applications such as building automation. Thus, automation components configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 connection with an RJ11 or other type of connector, an RJ45 Ethernet compatible port, and/or a universal serial bus (USB) connection. These wired, wireless devices or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b . . . 802.11n, etc.) These exemplary wired, wireless devices may further include a man-machine interface (MMI) such as a web-based interface screen that provide access to configurable properties of the device and allow the user to establish or troubleshoot communications between other devices and elements of the BAS.

FIG. 1 illustrates an exemplary building automation system or control system 100 that may incorporate the methods, systems and teaching provided herein. The control system 100 includes a first network 102 such as an automation level network (ALN) or management level network (MLN) in communication with one or more controllers such as a plurality of terminals 104 and a modular equipment controller (MEC) 106. The modular equipment controller or controller 106 is a programmable device which may couple the first network 102 to a second network 108 such as a floor level network (FLN). The second network 108, in this exemplary embodiment, may include a first wired network portion 122 and a second wired network portion 124 that connect to building automation components 110 (individually identified as automation components 110a to 110f). The second wired network portion 124 may be coupled to wireless building automation components 112 via the automation component 126. For example, the building automation components 112 may include wireless devices individually identified as automation components 112a to 112f. In one embodiment, the automation component 112f may be a wired device that may or may not include wireless functionality and connects to the automation component 112e. In this configuration, the automation component 112f may utilize or share the wireless functionality provided by the automation component 112e to define an interconnected wireless node 114. The automation components 112a to 112f may, in turn, communicate or connect to the first network 102 via, for example, the controller 106 and/or an automation component 126. The automation component 126 may be a field panel, FPX or another full function device in communication with the second wired network portion 124 which, in turn, may be in communication with the first network 102.

The control system 100 may further include automation components generally identified by the reference numerals 116a to 116g. The automation components 116a to 116g may be configured or arranged to establish one or more networks or subnets 118a and 118b. The automation components 116a to 116g such as, for example, full or reduced function devices and/or a configurable terminal equipment controller (TEC), cooperate to wirelessly communicate information between the first network 102, the control system 100 and other devices within the mesh networks or subnets 118a and 118b. For example, the automation component 116a may communicate with other automation components 116b to 116d within the mesh network 118a by sending a message addressed to the network identifier, alias and/or media access control (MAC) address assigned to each of the interconnected automation components 116a to 116g and/or to a field panel 120. In one configuration, the individual automation components 116a to 116d within the subnet 118a may communicate directly with the field panel 120 or, alternatively, the individual automation components 116a to 116d may be configured in a hierarchal manner such that only one of the components for example, automation component 116c, communicates with the field panel 120. The automation components 116e to 116g of the mesh network 118b may, in turn, communicate with the individual automation components 116a to 116d of the mesh network 118a or the field panel 120.

The automation components 112e and 112f defining the wireless node 114 may wirelessly communicate with the second network 108, and the automation components 116e to 116g of the mesh network 118b to facilitate communications between different elements, section and networks within the control system 100. Wireless communication between individual the automation components 112, 116 and/or the subnets 118a, 118b may be conducted in a direct or point-to-point manner, or in an indirect or routed manner through the nodes or devices comprising the nodes or networks 102, 108, 114 and 118. In an alternate embodiment, the first wired network portion 122 is not provided, and further wireless connections may be utilized.

Figure 2:
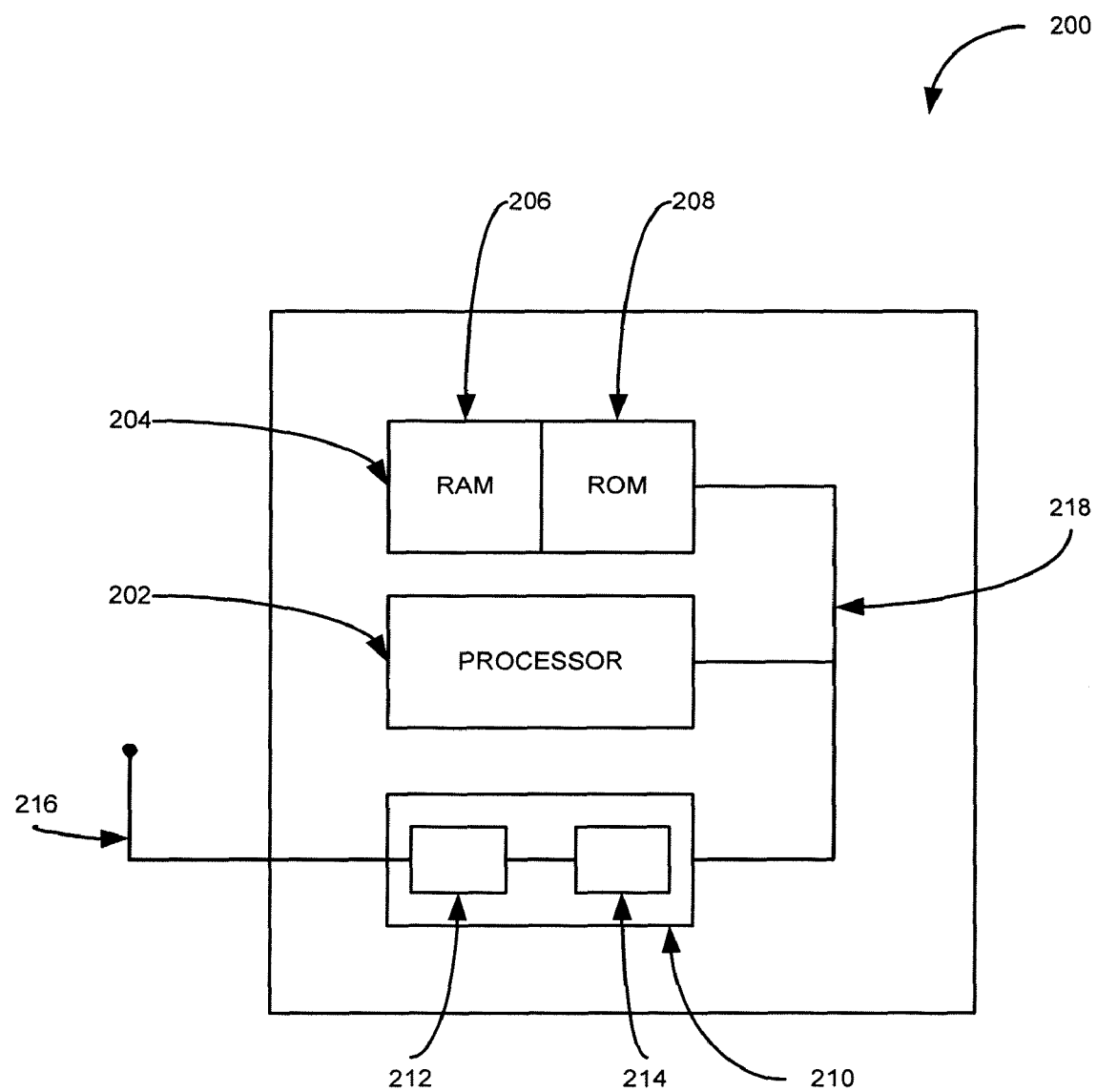
FIG. 2 illustrates an embodiment of a wireless device or automation component that may be utilized in connection with the building automation system shown in FIG. 1.

FIG. 2 illustrates an exemplary automation component 200 that may be utilized within the control system 100. The automation component 200 maybe be a full function device or a reduced function device and may be utilized interchangeably with the automation components 110, 112 and 116 shown and discussed in connection with FIG. 1. The automation component 200 in this exemplary embodiment may include a processor 202 such as an INTEL® PENTIUM, an AMD® ATHLON™ or other 8, 12, 16, 24, 32 or 64 bit classes of processors in communication with a memory 204 or storage medium. The memory 204 or storage medium may contain random access memory (RAM) 206, flashable or non-flashable read only memory (ROM) 208 and/or a hard disk drive (not shown), or any other known or contemplated storage device or mechanism. The automation component may further include a communications component 210. The communications component 210 may include, for example, the ports, hardware and software necessary to implement wired communications with the control system 100. The communications component 210 may alternatively, or in addition to, contain a wireless transmitter 212 and a receiver 214 communicatively coupled to an antenna 216 or other broadcast hardware.

The sub-components 202, 204 and 210 of the exemplary automation component 200 may be coupled and able to share information with each other via a communications bus 218. In this way, computer readable instructions or code such as software or firmware may be stored on the memory 204. The processor 202 may read and execute the computer readable instructions or code via the communications bus 218. The resulting commands, requests and queries may be provided to the communications component 210 for transmission via the transmitter 212 and the antenna 216 to other automation components 200, 112 and 116 operating within the first and second networks 102 and 108. Sub-components 202-218 may be discrete components or may be integrated into one (1) or more integrated circuits, multi-chip modules, and or hybrids.

The exemplary automation component 200 may be, for example, a WRTS deployed or emplaced within the structure. In operation, the WRTS may monitor or detect the temperature within a region or area of the structure. A temperature signal or indication representative of the detected temperature may further be generated by the WRTS. In another embodiment, the automation component 200 may be, for example, an actuator coupled to a sensor or other automation component. In operation, the actuator may receive a signal or indication from another automation component 200 and adjust the position of a mechanical component in accordance with the received signal. The signal or indication may be stored or saved within the memory 204. Moreover, the signal or indication may be stored to indicate that a change-of-value has occurred within the automation component 200. In other words, the detection or reception of the signal or indication may operate as a change-of-value flag which denotes that the information, setting, signals and/or indications stored within the memory 204 have been altered, updated or otherwise changed. Alternatively, a separate change-of-value flag may be set and/or correspond to each detected or received signal or indication.

II. Automation Component Communication and Updating

Figure 3:
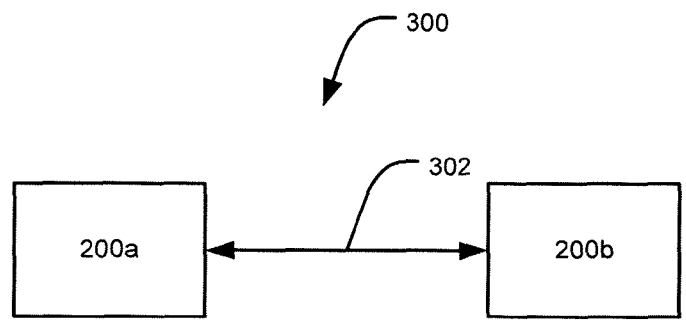
FIG. 3 illustrates an exemplary flowchart representative of a communications and updating configuration.

FIG. 3 illustrates an exemplary communications and updating configuration 300 that may be implemented between automation components 200. In this exemplary configuration, the automation components 200a may be configured to implement a request-response (polling) communication 302 in order to pull information from 200b device(s) to the polling device or for the 200b device to push values up to the 200a device. For example, the automation component 200a may represent a field panel, FPX or another full function device. Similarly, the automation component 200b may represent a TEC, FLNX, a Full function or reduced function device, a wireless actuator or any other wired or wireless device operable within the BAS 100. Moreover, the automation components 200a, 200b may be operative within, for example, the mesh network or subnet 118a.

A. Request-Response (Polled) Communications

Figure 4:
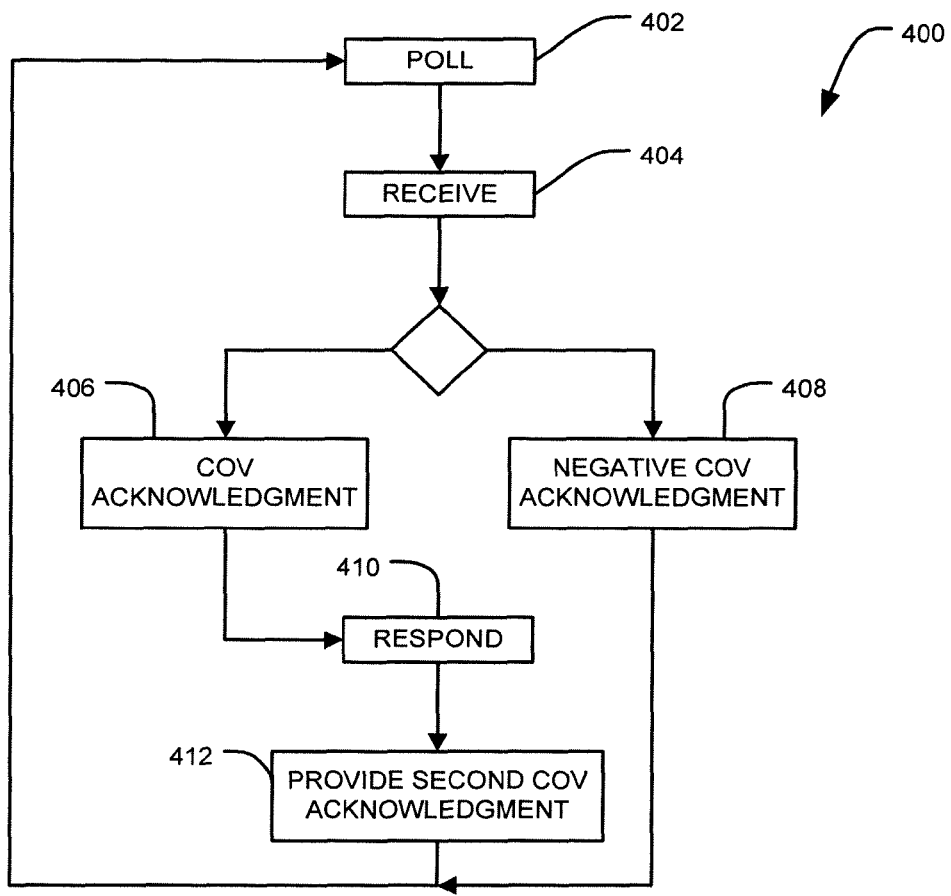
FIG. 4 illustrates an exemplary flowchart representative of a communications algorithm.

FIG. 4 illustrates a poll communication algorithm 400 or method that may be implemented, for example, between the automation components 200a, 200b. At block 402, the automation component 200a, which may be a field panel or other full function device, may generate and communicate a change-of-value (COV) request message to one or more automation components 200b operating within the BAS 100 and/or within the individual FLNs that make up the BAS 100. The COV request message may request or direct the automation component 200b to indicate whether any of the local detected values, received values, parameters, or measurements have changed or altered beyond a pre-defined reporting limit, e.g. COV limit.

At block 404, the automation component 200b receives the COV request message. For example, if the automation component 200b has, since receipt of the last COV request message, detected or received a new value representing the change-of-value, then at block 406 the automation component 200b may generate a COV acknowledgment message for communication to the automation component 200a. Alternatively, if the automation component 200b hasn't detected or received the new value representing the change-of-value, then at block 408 the automation component 200b may generate a negative COV acknowledgment message for communication to the automation component 200a.

At block 410, if the automation component 200a has successfully received the COV acknowledgment message provided by the automation component 200b, then the automation component 200a may generate and send an acknowledge COV request message for reply to the automation component 200b.

At block 412, the automation component 200b, in response to the acknowledge COV request message provided by the automation component 200a, knows the COV was successfully transferred to the device 200a and clears those reported COV's, and provides a acknowledge COV request acknowledgment message. After block 412, the communication algorithm 400 may restart and another wireless device or automation component within the BAS 100 may be polled. It will be understood that the exemplary communications algorithm 400 may be implemented in a wired or wireless BAS 100

B. Push Communications

Figure 5:
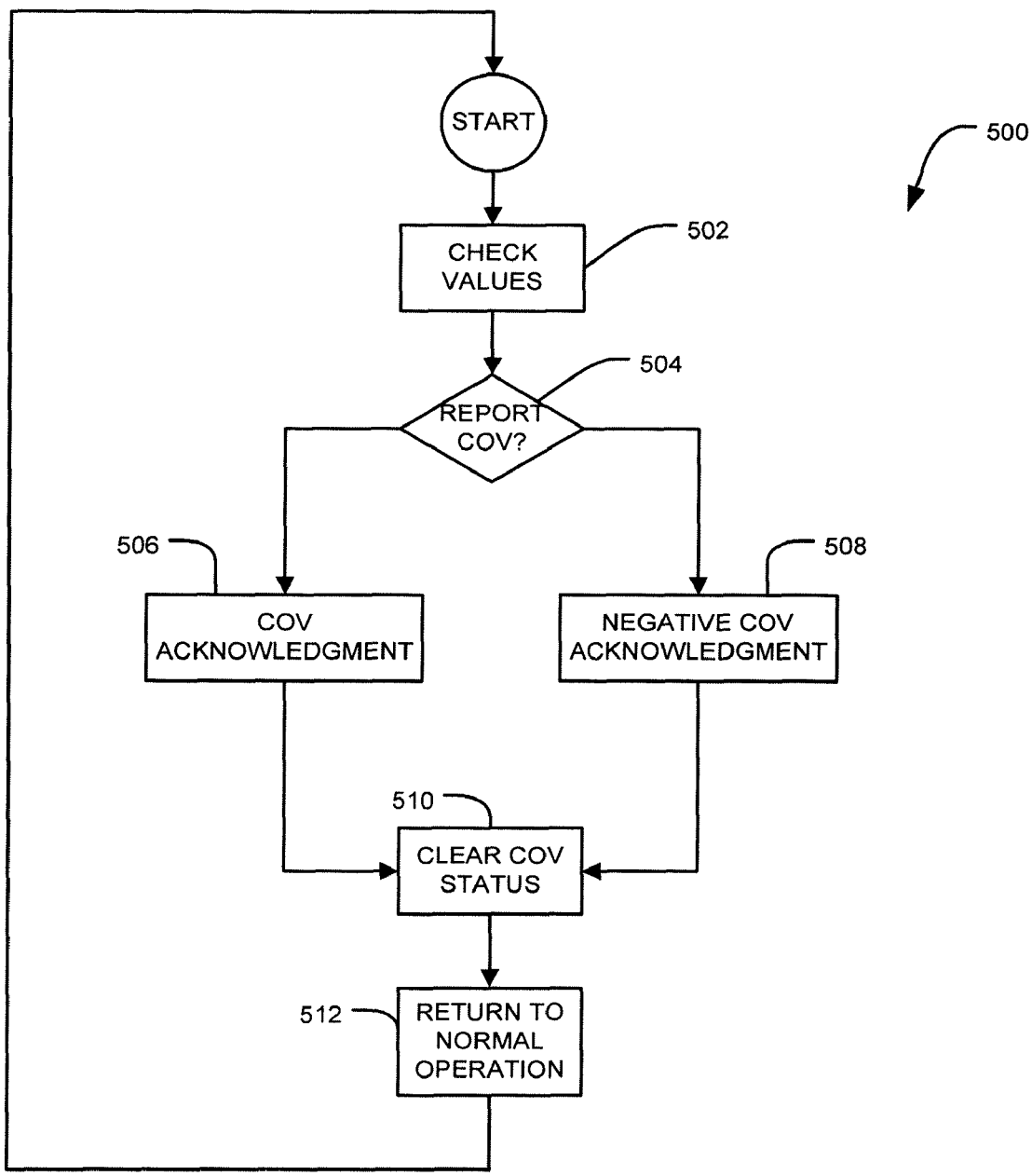
FIG. 5 illustrates an exemplary flowchart representative of another communications algorithm.

FIG. 5 illustrates an alternate communication algorithm 500 or method that may be implemented, for example, between the automation components 200a, 200b. The exemplary communication method 500 may be employed in a BAS 100 configured for hybrid communications utilizing both wired and wireless communications.

At block 502, the automation component 200b, which may be, for example, a full function device, an FLNX and or a TEC, will check its inputs and outputs for new or changed values. If the new value has changed more than a pre-defined amount from the last reported value, then the variable is to be reported on the next COV communication.

At block 504, the automation component 200b will check, at regular intervals established by an internal COV Reporting time interval or as needed by the internal algorithm, to see if Change-Of-Value (COV) are waiting to be reported. If so, the automation component 200b will create a Push COV message containing all queued COV values and send them to automation component 200a. At block 506, the automation component 200a may respond to automation component 200b with a Push COV acknowledge response if the message is received and understood, or, at block 508, will respond with a negative acknowledge (NAK) and an error code if the message was not understood. On receipt, at block 510, automation component 200b clears the COV status. At block 512, the automation component 200b may return to its normal operations until the next check for new values.

Automation component 200a now processes those queued COV's into the internal database of the automation component 200a and may optionally report those new values to other devices as defined in the drawings and description of FIG. 1.

If automation component 200b was in fact a hardwired device with an external wireless network interface, such as a TEC with an FLNX configuration, then the FLNX would need to poll the TEC for COV's and hold them within the FLNX while the communication to automation component 200a was occurring. In addition, the FLNX would need to acknowledge the COV's from the TEC as was defined in algorithm of FIG. 4.

If automation component 200a was a hardwired device with an external wireless network interface, such as a field panel with an FPX, then the FPX would need to act has the buffer for pushed COV's and queue the COV's for the field panel. The field panel would poll the FPX, in accordance with the algorithms of FIG. 4, to accept the COV's into the database of the automation component 200a.

In this configuration, the communication algorithm 500 allows COV related messages to be gathered and pushed from one or more automation components 200b up to the 200a device and from the 200a device to other system components as defined in FIG. 1. By pushing COV's up to automation component 200a as opposed to polling each automation component 200b, less wireless bandwidth is used and system end to end delays shortened.

If the automation component 200b is operating in a stable state without any COV's for extended periods of time (as defined by internal variable), the automation component 200b will communicate with the automation component 200a so that the automation component 200a knows that the automation component 200b is still operating. If the automation component 200a does not receive a message from the automation component 200b for a period longer than the internal variable defined within the automation component 200b, then the automation component 200a will report a loss of communication with the automation component 200b.

The communications algorithm 500 may be further configured to address and handle communications difficulties or errors between, for example, the automation components 200a, 200b. For example, if COV polling requests cannot be communicated or are not acknowledged by the intended receiving automation component, then the algorithm 500 may be configured to recover from the communications failure. Communication recovery may include repeating communication attempts a predetermined number of times (e.g., ten attempts). Similarly, if repeated communication attempts are unsuccessful, then the communication recovery may timeout and the procedure may be reattempted after a predetermined delay (e.g., every thirty minutes). Moreover, during the period when communication is not possible, the COV-related messages may still be aggregated and stored pending the reestablishment of communications.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. Well understood changes and modifications can be made based on the teachings and disclosure provided by the present invention and without diminishing from the intended advantages disclosed herein. It is therefore intended that such changes and modifications be covered by the appended claims.

What is claimed is:

1. An automation component configured for wireless communication within a building automation system, the automation component comprising:
   a wireless communications component;
   a processor in communication with the wireless communications component;
   a memory in communication with the processor, the memory configured to store computer readable instructions which are executable by the processor;
   wherein the computer readable instructions are programmed to:
      process a change-of-value request message received via the wireless communications component;
      generate a change-of-value update in response to the change-of-value request message, wherein the change-of-value update includes a plurality of change-of-value messages received from a plurality of devices; and
      communicate the change-of-value update via the wireless communication component at regular intervals according to a schedule or until a change-of-value acknowledgment is received.

2. The automation component of claim 1, wherein the change-of-value request message is received from a wireless device.

3. The automation component of claim 2, wherein the wireless device is a ZigBee-compliant device, a terminal equipment controller, a wireless room temperature sensor, a reduced function device, or a full function device.

4. The automation component of claim 1, wherein the change-of-value update is a change-of-value response message.

5. The automation component of claim 1, wherein the change-of-value update is automatically communicated.

6. The automation component of claim 1, wherein the change-of-value update is pulled to a field panel transceiver in response to the reception of the change-of-value request message by the wireless communication component.

7. The automation component of claim 6, wherein the computer readable instructions are further programmed to:
process an acknowledgment message communicated by the field panel transceiver in response to the change-of-value update.

8. A method of communicating information between automation components operating within a building automation system, the method comprising:
detecting an indication representing a change-of-value;
generating a change-of-value update that includes a plurality of change-of-value messages received from a plurality of devices;
repetitively communicating the change-of-value update in response to the detected indication;
receiving an acknowledgment of the communicated change-of-value update; and
terminating communication of the change-of-value update in response to the received acknowledgement.

9. The method of claim 8, wherein the indication is a sensor reading, a temperature indication, or an actuator position.

10. The method of claim 8, wherein at least one of the plurality of change-of-value messages includes the change-of-value and a device indicator.

11. The method of claim 8, wherein communicating the change-of-value update includes automatically communicating the change-of-value update.

12. The method of claim 8, wherein communicating the change-of-value update includes pushing the change-of-value update to a communicatively coupled wireless device.

13. An automation component configured for wireless communication within a building automation system, the automation component comprising:
a wireless communications component;
a processor in communication with the wireless communications component;
a memory in communication with the processor, the memory configured to store computer readable instructions which are executable by the processor;
wherein the computer readable instructions are programmed to:
receive at least one change-of-value update via the wireless communications component, wherein the change-of-value update includes a plurality of change-of-value messages received from a plurality of devices;
storing the at least one change-of-value update corresponding to at least one wireless device; and
communicate the at least one change-of-value update in response to a polling request and repeat the at least one change-of-value update at regular intervals according to a schedule or until a change-of value acknowledgment is received.

14. The automation component of claim 13, wherein the change-of-value update is received from a wireless device selected from a Zig Bee-compliant device, a terminal equipment controller, a wireless room temperature sensor, a reduced function device, or a full function device.

15. The automation component of claim 13, wherein the change-of-value update is a pushed communication.

16. The automation component of claim 13, wherein the computer readable instructions are further programmed to:
communicate an acknowledgment in response to the received at least one change-of-value update.

17. A method of communicating information between automation components operating within a building automation system, the method comprising:
receiving a plurality of change-of-value messages from a plurality of wireless devices, each of the plurality of change-of-value messages representing a wireless device indication;
storing the received change-of-value messages according to the corresponding wireless device of the plurality of wireless devices; and
communicating a change-of-value update that includes the plurality of change-of-value messages, and repeating the change-of-value update at regular intervals according to a schedule or until a change-of-value acknowledgment is received.

18. The method of claim 17, wherein the wireless device indication is selected from a sensor reading, a temperature indication, or an actuator position.

19. The method of claim 17, wherein each of the plurality of the change-of-value messages includes the change-of-value and a device indicator.

20. The method of claim 17, wherein communicating the change-of-value update includes automatically communicating the change-of-value-update.

21. The method of claim 17, wherein communicating the change-of-value update includes pushing the change-of-value-update to a communicatively coupled wireless device.

* * * * *